(12) United States Patent
Hauser et al.

(10) Patent No.: US 11,437,657 B2
(45) Date of Patent: Sep. 6, 2022

(54) METHOD FOR CONTROLLING A RECHARGEABLE BATTERY ON A MACHINE TOOL

(71) Applicant: Hilti Aktiengesellschaft, Schaan (LI)

(72) Inventors: Klaus Hauser, Schwabmuenchen (DE); Michael Candussio, Olching (DE); Stefan Mayer, Dachau (DE); David Koscheck, Augsburg (DE)

(73) Assignee: Hilti Aktiengesellschaft, Schaan (LI)

( * ) Notice: Subject to any disclaimer, the term of this patent is extended or adjusted under 35 U.S.C. 154(b) by 251 days.

(21) Appl. No.: 16/645,265

(22) PCT Filed: Aug. 27, 2018

(86) PCT No.: PCT/EP2018/072990
§ 371 (c)(1),
(2) Date: Mar. 6, 2020

(87) PCT Pub. No.: WO2019/048275
PCT Pub. Date: Mar. 14, 2019

(65) Prior Publication Data
US 2020/0280106 A1    Sep. 3, 2020

(30) Foreign Application Priority Data

Sep. 7, 2017 (EP) .................................... 17189730

(51) Int. Cl.
*H01M 10/42* (2006.01)
*H01M 10/44* (2006.01)

(52) U.S. Cl.
CPC ......... *H01M 10/425* (2013.01); *H01M 10/44* (2013.01); *H01M 2010/4271* (2013.01); *H01M 2010/4278* (2013.01); *H01M 2220/30* (2013.01)

(58) Field of Classification Search
CPC . B25B 21/00; H01M 10/425; H01M 10/4257; H01M 10/44; H01M 2010/4271;
(Continued)

(56) References Cited

U.S. PATENT DOCUMENTS

2016/0056655 A1    2/2016    Kaneda et al.
2016/0064776 A1    3/2016    Ro et al.

FOREIGN PATENT DOCUMENTS

DE    102015010739 A1    2/2016
EP       2562905 A1    2/2013

OTHER PUBLICATIONS

International Search Report of PCT/EP2018/072990, dated Nov. 7, 2018.

*Primary Examiner* — Victoria H Lynch
(74) *Attorney, Agent, or Firm* — Davidson, Davidson & Kappel, LLC

(57) ABSTRACT

A method for controlling a rechargeable battery on a machine tool contains the steps of:
  setting the control electronics of the rechargeable battery to a deactivation mode, with the result that no current flows from the rechargeable battery into the control electronics and to the machine tool;
  transmitting at least one signal from the machine tool to the rechargeable battery via the first and second communication lines;
  activating the wake-up circuit for activating control electronics by detecting a voltage value from the first or second communication line, wherein the voltage value corresponds to either the dominant or the recessive state of the first or second communication line;
  setting the control electronics of the rechargeable battery to an activation mode via the wake-up circuit; and
  enabling current to be drawn from the rechargeable battery by the machine tool.

(Continued)

A system containing a rechargeable battery and a machine tool, a rechargeable battery and a machine tool for carrying out the method are also provided.

16 Claims, 2 Drawing Sheets

(58) Field of Classification Search
CPC ... H01M 2010/4278; H01M 2200/105; H01M 2220/30; Y02E 60/10
See application file for complete search history.

METHOD FOR CONTROLLING A RECHARGEABLE BATTERY ON A MACHINE TOOL

The present invention relates to a method for controlling a rechargeable battery on a machine tool, wherein the rechargeable battery contains a first data interface and a wake-up circuit for activating control electronics of the rechargeable battery, and the machine tool contains a second data interface and a controller, and wherein the data interfaces are connected to one another via a first and a second communication line for differential communication between the rechargeable battery and the machine tool.

The present invention furthermore relates to a system containing a rechargeable battery and a machine tool for carrying out the method, wherein the rechargeable battery contains a first data interface and a wake-up circuit for activating control electronics of the rechargeable battery, and the machine tool contains a second data interface and a controller, and wherein the data interfaces are connected to one another via a first and a second communication line for differential communication between the rechargeable battery and the machine tool.

In addition, the invention relates to a rechargeable battery for carrying out the method, wherein the rechargeable battery contains a first data interface and a wake-up circuit for activating control electronics of the rechargeable battery.

Further, the invention relates to a machine tool for carrying out the method, wherein the machine tool contains a second data interface and a controller.

BACKGROUND

Cordless machine tools can be operated with a rechargeable battery for the purpose of supplying power or energy. For this purpose, the rechargeable battery is connected to the machine tool via a corresponding interface such that electric current can flow from the rechargeable battery to the machine tool. The cordless machine tool can be, for example, a rechargeable battery-operated screwdriver, a hammer drill, or suchlike.

Commercially available rechargeable batteries usually contain a number of storage cells or energy storage cells for electrical energy or for an electrical voltage. For the purpose of controlling a charging or discharging process of the energy storage cells, in which charging or discharging process the energy storage cells are either charged with electrical energy or the electrical energy is drawn (discharged) from the storage cells, a modern rechargeable battery has control electronics for closed-loop and open-loop control of various processes in the rechargeable battery. The storage cells are also known as rechargeable battery cells or secondary cells.

In order to save electrical energy of a rechargeable battery, the control electronics of the rechargeable battery are put into a deactivation mode (also referred to as sleep mode or sleep state) if the rechargeable battery-operated machine tool is not operated for a certain time duration. In said deactivation mode, no electric current flows from the rechargeable battery into the control electronics and/or to the machine tool.

However, if the rechargeable battery-operated machine tool is intended to be put into operation again, in order that electric current can once again flow from the rechargeable battery to the electrical loads of the machine tool, the rechargeable battery firstly has to be reactivated, i.e. switched from the deactivation mode to an activation mode (i.e. woken up). The rechargeable battery has to be in the activation mode in order for example to control the amount of current or the current intensity that flows to the machine tool, or to monitor the temperature of the rechargeable battery.

However, such a reactivation of the rechargeable battery constitutes a degree of complexity since firstly a wake-up circuit of the rechargeable battery has to be activated with the aid of a separate signal in the form of a voltage pulse. The wake-up circuit subsequently (re)activates the control electronics of the rechargeable battery in order that the supply of the machine tool with electric current can be continued.

SUMMARY OF THE INVENTION

To solve this problem, rechargeable batteries in accordance with the prior art offer a separate line from the controller of the machine tool to the wake-up circuit of the rechargeable battery. However, the provision of such a line is complex and produces additional costs and space problems.

It is an object of the present invention to provide a method for controlling a rechargeable battery on a machine tool that allows the aforementioned problem to be solved. In addition, it is an object of the present invention to provide a system containing a rechargeable battery and a machine tool for carrying out the method that allows the aforementioned problem to be solved. Furthermore, it is an object of the present invention to provide a rechargeable battery and a machine tool in order to solve the aforementioned problem.

The present invention provides a method for controlling a rechargeable battery on a machine tool, wherein the rechargeable battery contains a first data interface and a wake-up circuit for activating control electronics of the rechargeable battery, and the machine tool contains a second data interface and a controller, and wherein the data interfaces are connected to one another via a first and a second communication line for differential communication between the rechargeable battery and the machine tool.

According to the invention, the method contains the following method steps:
  setting the control electronics of the rechargeable battery to a deactivation mode, with the result that no current flows from the rechargeable battery into the control electronics and to the machine tool;
  transmitting at least one signal from the machine tool to the rechargeable battery via the first and second communication lines;
  activating the wake-up circuit for activating control electronics by detecting a voltage value from the first or second communication line, wherein the voltage value corresponds to either the dominant or the recessive state of the first or second communication line;
  setting the control electronics of the rechargeable battery to an activation mode by means of the wake-up circuit; and
  enabling current to be drawn from the rechargeable battery by the machine tool.

What can thereby be achieved in a simple manner is that the wake-up circuit of the rechargeable battery, with the aid of the differential communication, detects a corresponding signal in the form of a current pulse in order to reactivate the control electronics of the rechargeable battery. The solution presented saves both space and costs since a communication system already present can be used.

The first and second communication lines for differential communication between the rechargeable battery and the machine tool are parts of a communication system. In this case, the communication system can be configured as a CAN data bus. However, it is also possible to use some other suitable communication system for differential communication between the rechargeable battery and the machine tool.

Enabling current to be drawn from the rechargeable battery by the machine tool means that the machine tool is able, with the aid of a current measuring device, to measure the current provided by the rechargeable battery for the supply of the machine tool and to cause a maximum possible amount of current or a supply current having a maximum possible current intensity to flow from the rechargeable battery to the machine tool. For this purpose, the rechargeable battery is set by the machine tool such that only a maximum possible supply current can pass to the machine tool.

The present invention also provides a system containing a rechargeable battery and a machine tool for carrying out the method, wherein the rechargeable battery contains a first data interface and a wake-up circuit for activating control electronics of the rechargeable battery, and the machine tool contains a second data interface and a controller, and wherein the data interfaces are connected to one another via a first and a second communication line for differential communication between the rechargeable battery and the machine tool.

The present invention also provides a rechargeable battery for carrying out the method, wherein the rechargeable battery contains a first data interface and a wake-up circuit for activating control electronics of the rechargeable battery.

The present invention also provides a machine tool for carrying out the method, wherein the machine tool contains a second data interface and a controller.

Further advantages are evident from the following description of the figures. The figures illustrate various exemplary embodiments of the present invention. The figures, the description and the claims contain numerous features in combination. A person skilled in the art will expediently also consider the features individually and combine them to produce useful further combinations.

DETAILED DESCRIPTION

Figure 1:
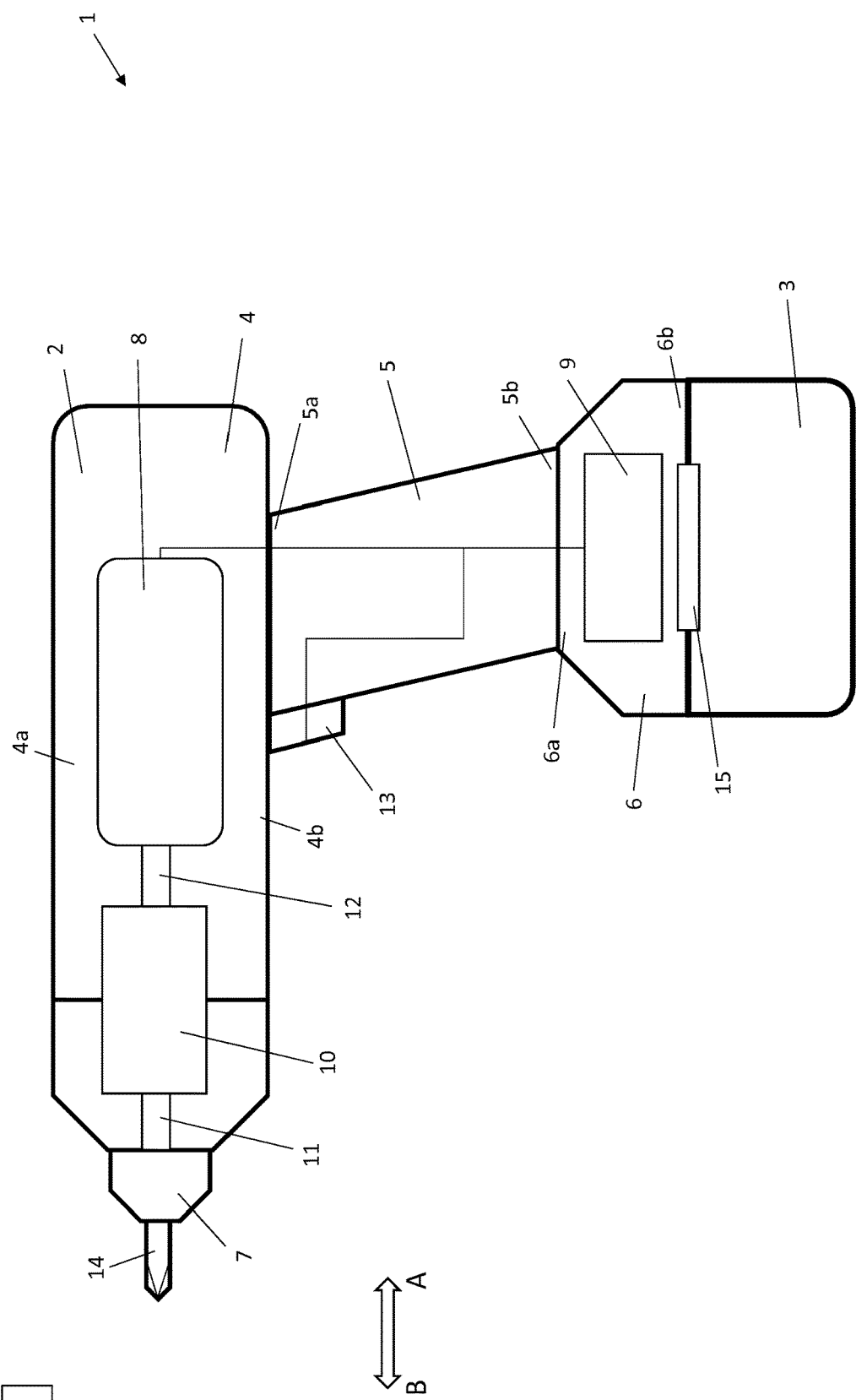
FIG. 1 shows a cross section through a machine tool with a connected rechargeable battery.

FIG. 1 illustrates a system 1 according to the invention comprising a machine tool 2 and a rechargeable battery 3. The rechargeable battery 3 is connected to the machine tool and serves for supplying the electrical loads of the machine tool 2 with electrical energy. During the supply, electric current flows from the rechargeable battery 3 to the machine tool 2.

As illustrated in FIG. 1, the machine tool 2 is illustrated in the form of a rechargeable battery-operated screwdriver. In accordance with other alternative embodiments, the machine tool 2 can also be configured in the form of a drill, a saw or the like.

The machine tool 2 configured as a rechargeable battery-operated screwdriver substantially contains a housing 4, a handle 5, a base part 6, a tool holder 7, an electric drive 8 in the form of an electric motor, a controller 9, a gear mechanism 9a, a drive shaft 11, an output shaft 12 and an activation switch 13.

The electric drive 8 configured as an electric motor, the gear mechanism 10, the drive shaft 11, the output shaft 12 and the controller 9 are positioned in the housing 4. The drive 8, the gear mechanism 10, the drive shaft 11 and the output shaft 12 are positioned with respect to one another and in the housing 10 such that a torque generated by the drive 8 is transmitted to the output shaft 12. The output shaft 12 transmits the torque to the gear mechanism 10, which in turn forwards a torque to the drive shaft 11. The tool holder 7 is driven by way of the drive shaft 11 by the transmission of the torque. As illustrated in FIG. 1, a tool 14 in the form of a bit is held in the tool holder 7. With the aid of the bit, a screw can be screwed into a material. Neither the screw nor the material is illustrated in the figures.

As furthermore shown in FIG. 1, the housing 4 contains a top side 4a and an underside 4b. The handle 5 contains a first end 5a and a second end 5b. The first end 5a of the handle 5 is secured to the underside 4b of the housing 4. Furthermore, the base part 6 contains an upper end 6a and a lower end 6b. The upper end 6a of the base part 6 is secured to the second end 5b of the handle 5. The lower end 6b of the base part 6 contains a mechanical, electrical and electronic interface 15 and serves for mechanical, electrical and electronic connection to the rechargeable battery 3. For the purpose of taking up electric current, the interface 15 contains a number of power connections 16. The interface 15 furthermore contains data connections 17 for transmitting and receiving signals between the machine tool 2 and the rechargeable battery 3.

Figure 2:
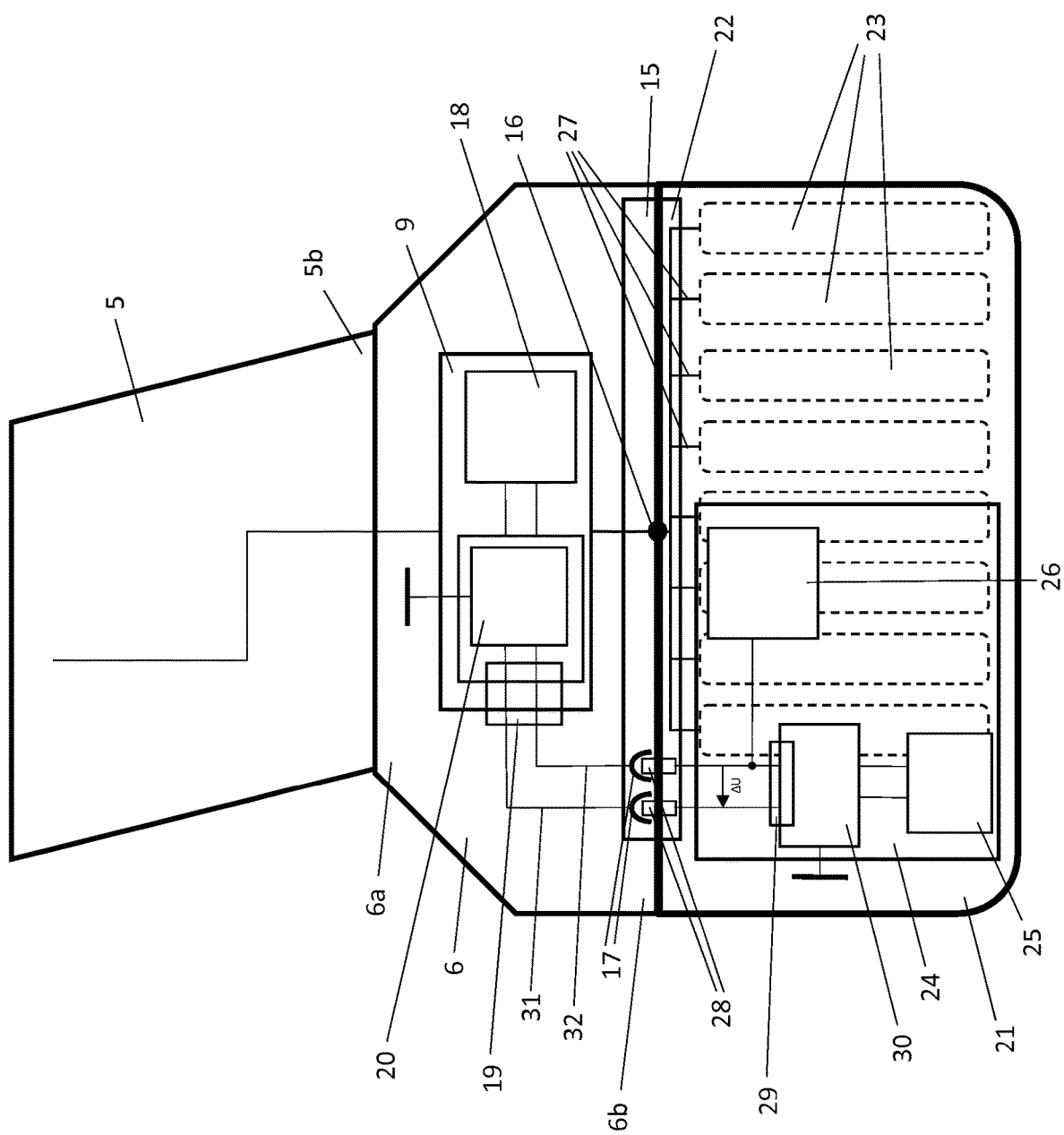
FIG. 2 shows a cross section through a base part of the machine tool with a connected rechargeable battery.

As can be gathered from FIGS. 1 and 2, the controller 9 of the machine tool 2 is positioned in the base part 6 of the machine tool 2. The controller 9 of the machine tool 2 serves for open-loop and closed-loop control of various processes in relation to the machine tool 2 and in relation to the rechargeable battery 3. The controller 9 controls in particular the current or the current intensity that flows from the rechargeable battery 3 to the machine tool 2 and in particular for driving the drive 8 embodied as an electric motor.

In this case, the controller 9 of the machine tool 2 contains a microcontroller 18 (also referred to as MCU) and a data interface 19 with a first transceiver 20 as part of a communication system for differential communication between the rechargeable battery 3 and the machine tool 2. In this case, the data interface 19 of the machine tool 2 is one of a total of two data interfaces to the communication system for the differential communication between the rechargeable battery 3 and the machine tool 2. As also described below, the rechargeable battery 3 contains the other data interface 29 of the two data interfaces.

The rechargeable battery 3 substantially contains a housing 21 having a rechargeable battery interface 22. The housing 21 of the rechargeable battery 3 contains a multiplicity of energy storage cells 23 and control electronics 24 having a microcontroller 25 and a wake-up circuit 26. The wake-up circuit 26 is used to set the control electronics 24 to an activation mode from a deactivation mode. In other words: the wake-up circuit 26 wakes up the control electronics 24 again after they have gone to sleep.

The rechargeable battery 3 furthermore contains a data interface 29 with a second transceiver 30 as part of a communication system for differential communication between the rechargeable battery 3 and the machine tool 2.

The temperature monitoring of the rechargeable battery 3 is effected by means of an NTC thermistor (also called negative temperature coefficient thermistor), not shown, which is positioned in the rechargeable battery 3.

The energy storage cells 23 can also be referred to as rechargeable battery cells and serve for taking up, storing and providing an electrical energy or an electrical voltage.

The rechargeable battery interface 22 is positioned on one side of the housing 21. The rechargeable battery interface 22 contains a number of power connectors 27 for taking up and outputting electric current and data connectors 28 for transmitting and receiving signals between the machine tool 2 and the rechargeable battery 3. The electric current from the energy storage cells 23 can be output via the power connectors 27.

As shown in FIGS. 1 and 2, the power connectors 27 of the rechargeable battery 3 are connected to the power connections 16 of the machine tool 2. Likewise, the data connectors 28 of the rechargeable battery 3 are connected to the data connections 17 of the machine tool 2.

Through the connection, electric current can flow from the energy storage cells 23 of the rechargeable battery 3 to the machine tool 2. Furthermore, it is possible to exchange signals for communication between the rechargeable battery 3 and the machine tool 2.

As can be gathered from FIG. 1, the activation switch 13 is positioned on a front side 5c of the handle 5. As a result of the activation switch 13 being moved in direction A, a signal can be transmitted from the activation switch 13 to the controller 9, as a result of which the controller 9 in turn transmits a signal to the control electronics 24 of the rechargeable battery 3. The signal transmitted to the control electronics 24 enables the release of electrical energy or electric current having a specific current value from the rechargeable battery 3 for the electrical load of the machine tool 2 and in particular the drive 8 embodied as an electric motor. The machine tool 2 has a current device (not shown) that can measure the current intensity of the supply current. If a supply current having a permissible current intensity is measured, the supply current can flow to the electrical loads of the machine tool 2. Alternatively or additional, the current measuring device can also be positioned in the rechargeable battery 3.

In order to transmit a signal corresponding to the travel of the activation switch 13 in direction A to the controller 9, the activation switch 13 contains a potentiometer (not shown).

If the activation switch 13 moves again in direction B, a corresponding signal is transmitted to the controller 9 with the aid of the potentiometer (not shown), with the result that electric current no longer flows from the rechargeable battery 3 to the machine tool 2.

The communication between the rechargeable battery 3 and the machine tool 2 is effected via a communication system in the form of a CAN data bus. In order to participate in the communication system, both the rechargeable battery 3 and the machine tool 2 respectively contain a data interface 19, 29 with a transceiver 20, 30. The transceivers 20, 30 here are configured as CAN transceivers. As indicated in FIG. 2, the transceiver 20 of the machine tool is connected to the transceiver 30 of the rechargeable battery 3 via the data interface and a first communication line 31 (also referred to as COM high or CAN high line) and a second communication line 32 (also referred to as COM low or CAN low line) and the data interface 29. As can likewise be gathered from FIG. 2, the wake-up circuit 26 of the rechargeable battery 3 is connected to the first communication line 31, i.e. COM high. Alternatively, the wake-up circuit 26 of the rechargeable battery 3 can be connected to the second communication line 32, i.e. COM low.

In the case where the machine tool 2 and the rechargeable battery 3 are not in use for a certain time duration, i.e. at least 2 minutes, the rechargeable battery 3 is automatically switched from an activation mode to a deactivation mode with the aid of the control electronics 24. If the rechargeable battery 3 is in the deactivation mode, no electric current flows from the energy storage cells 23 to the control electronics 24 and to the machine tool 2. Furthermore, all possible electrical loads of the rechargeable battery 3, such as e.g. the control electronics 24, the temperature sensor for monitoring the rechargeable battery temperature or the like, are switched off. The deactivation mode serves to save power since the electrical voltage in the energy storage cells 23 is not subjected to any load.

If the use of the machine tool 2 and the rechargeable battery 3 is intended to be resumed after a specific time duration, firstly the rechargeable battery 3 as energy donor for the machine tool 2 has to be brought from the deactivation mode to the activation mode again. To put the machine tool 2 into operation once again, firstly the activation switch 13 is moved in direction A. As a result, a signal is transmitted via the controller 9 of the machine tool 2. The transceiver 20 of the machine tool 2 transmits a signal (e.g. one bit) via the data interface 19 and the first and second communication lines 31, 32 to the data interface 29 and the transceiver 30 of the rechargeable battery 3.

To transmit a signal in the form of one bit via the communication system, both the COM-High line 31 and the COM-Low line 32 are put into a dominant state. The wake-up circuit 26 of the rechargeable battery 3 is connected to the COM-High line 31. To set the control electronics 24 of the rechargeable battery 3 back to an activation mode from the deactivation mode, the wake-up circuit 26 of the rechargeable battery 3 requires an electrical voltage of at least 0.9 volt. In order to supply the wake-up circuit 26 with a sufficient electrical voltage, the voltage value from the COM-high line 31 in the dominant state of the communication system configured as a CAN data bus is detected by the wake-up circuit 26. The voltage value of the COM-High line 26 in a dominant state is 3.5 volts, with the result that a sufficiently high voltage is available for activating the wake-up circuit 26. Alternatively, it is also possible for the voltage value of 1.5 volts of the COM-Low or second communication line 32 to be used for supplying the wake-up circuit 26 with a sufficient electrical voltage (i.e. greater than 0.9 volt). For this purpose, the wake-up circuit 26 is connected to the COM-Low or second communication line 32.

After the voltage value of the COM-High line or first communication line 31 in the dominant state has been detected, the wake-up circuit 26 puts the control electronics 24 of the rechargeable battery 3 back into the activation mode from the deactivation mode. The same correspondingly applies if, in an alternative configuration, the wake-up circuit 26 is connected to the COM-Low or second communication line 32.

In the activation mode, for the supply of the electrical loads, in particular of the electric motor, a specific current value from the energy storage cells 23 of the rechargeable battery 3 is transmitted to the machine tool 2. Furthermore, all monitoring functions of the rechargeable battery 3, such as e.g. temperature monitoring, are also resumed again.

Alternatively, the voltage value of the COM-High line or first communication line 31 in the recessive state can also be detected in order to activate the wake-up circuit 26 of the rechargeable battery 3. In this instance, a voltage of 2.5 volts from the COM-High line or first communication line 31 is transmitted to the wake-up circuit 26. Since activating the wake-up circuit 22 requires a voltage greater than 0.9 volt, the voltage value of the COM-High line or first communication line 31 in the recessive state is also sufficient.

In accordance with a further alternative, the voltage value of the COM-Low line or second communication line 32 in the recessive state can also be detected in order to activate the wake-up circuit 26 of the rechargeable battery 3. In this case too, the voltage value is greater than 0.9 volt, namely likewise 2.5 volts.

What is claimed is:

1. A method for controlling a rechargeable battery on a machine tool, the rechargeable battery including a first data interface and a wake-up circuit for activating control electronics of the rechargeable battery, and the machine tool including a second data interface and a controller, the first and second data interfaces being connected to one another via a first and a second communication line for differential communication between the rechargeable battery and the machine tool, the method comprising the steps of: setting the control electronics of the rechargeable battery to a deactivation mode, with a result that no current flows from the rechargeable battery into the control electronics and to the machine tool; transmitting at least one signal from the machine tool to the rechargeable battery via the first and second communication lines; activating the wake-up circuit for activating control electronics by detecting a voltage value from the first or second communication line, wherein the voltage value corresponds to either a dominant or a recessive state of the first or second communication line; setting the control electronics of the rechargeable battery to an activation mode via the wake-up circuit; and enabling current to be drawn from the rechargeable battery by the machine tool.

2. A system comprising the rechargeable battery and the machine tool for carrying out the method as recited in claim 1, the rechargeable battery including the first data interface and the wake-up circuit for activating the control electronics of the rechargeable battery, and the machine tool including the second data interface and the controller and wherein the first and second data interfaces are connected to one another via the first and the second communication line for differential communication between the rechargeable battery and the machine tool.

3. A rechargeable battery for carrying out the method as recited in claim 1 wherein the rechargeable battery includes the first data interface and the wake-up circuit for activating the control electronics of the rechargeable battery.

4. A machine tool for carrying out the method as recited in claim 1 wherein the machine tool includes the second data interface and the controller.

5. The method as recited in claim 1 wherein the machine tool is a battery-operated screwdriver.

6. The method as recited in claim 1 wherein the controller of the machine tool is positioned in a base part of the machine tool and the controller controls the current flowing from the rechargeable battery to the machine tool.

7. The method as recited in claim 6 wherein the current drives a drive of the machine tool.

8. The method as recited in claim 7 wherein the drive is embodied as an electric motor.

9. The method as recited in claim 1 wherein communication between the rechargeable battery and the machine tool is effected via a communication system in the form of a CAN data bus.

10. The method as recited in claim 9 wherein the first communication line is a CAN high line, and the second communication line is a CAN low line.

11. The method as recited in claim 10 wherein the wake-up circuit is connected to the first communication line.

12. The method as recited in claim 5 wherein the wake-up circuit is connected to the first communication line.

13. The method as recited in claim 1 wherein the rechargeable battery is automatically switched to the deactivation mode from the activation mode after a certain time duration where the machine tool and the rechargeable battery are not in use.

14. The method as recited in claim 13 wherein the certain time duration is at least 2 minutes.

15. The method as recited in claim 1 wherein the at least one signal is sent when an activation switch is moved in a direction.

16. The method as recited in claim 15 wherein the at least one signal is a one bit signal.

\* \* \* \* \*